Aug. 16, 1938.   H. W. DRAKE   2,127,057
STEERING DEVICE FOR TRAILERS
Filed May 22, 1937   4 Sheets-Sheet 2
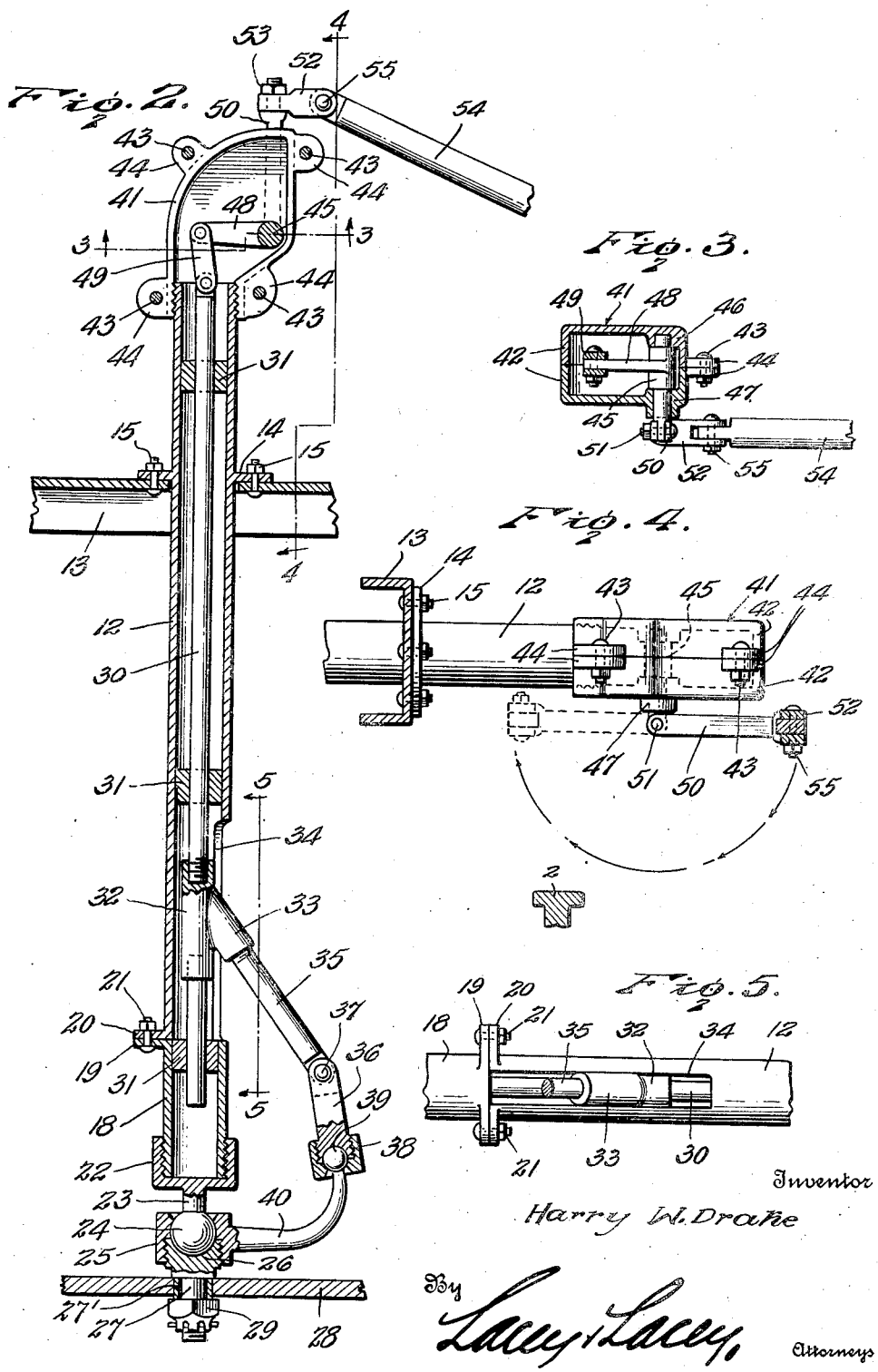
Inventor
Harry W. Drake
By Lacey & Lacey,
Attorneys

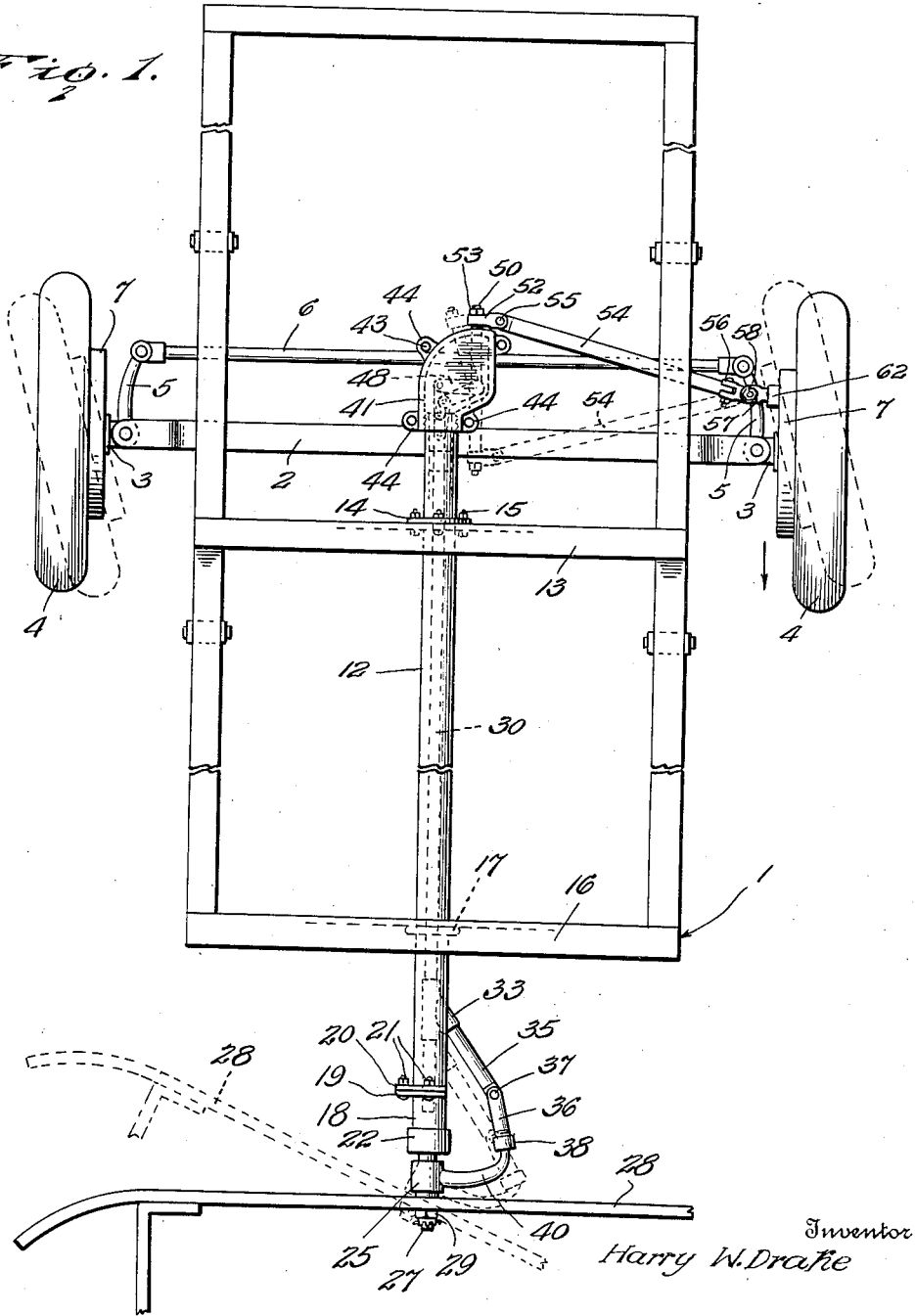

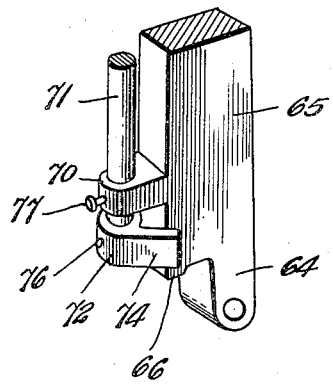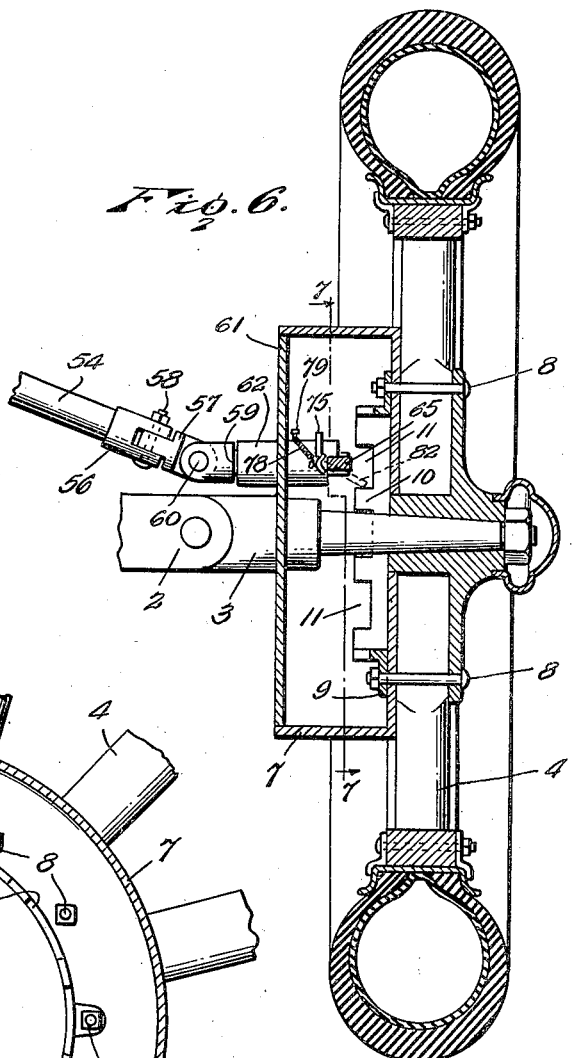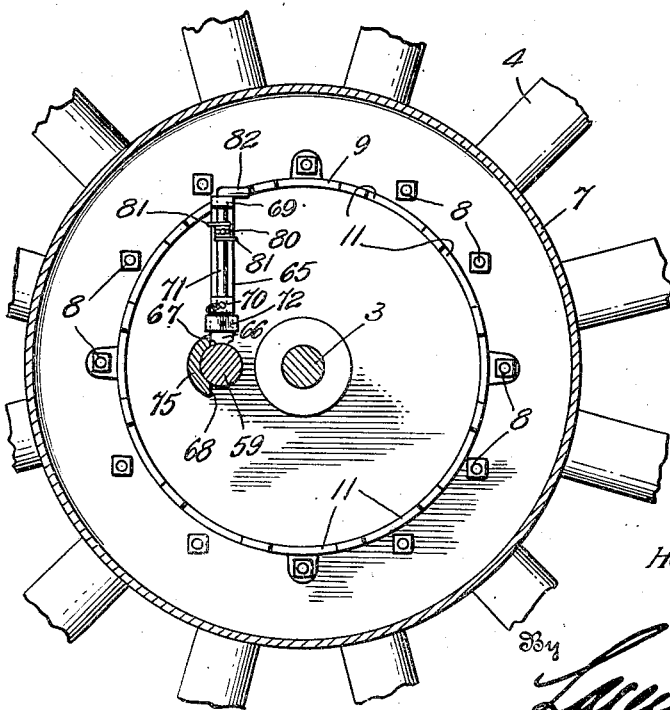

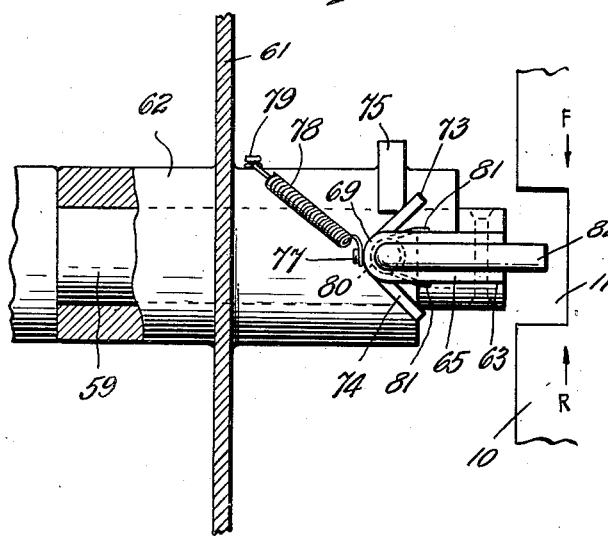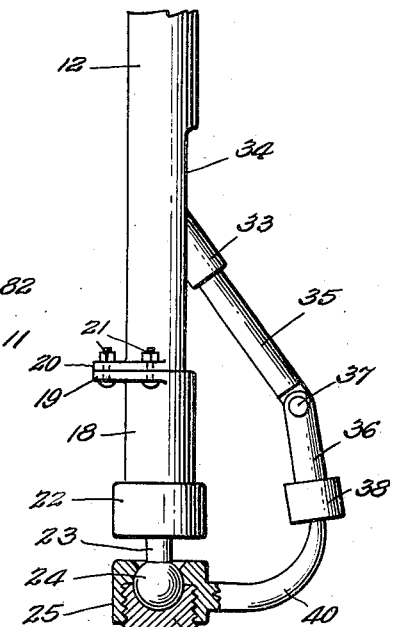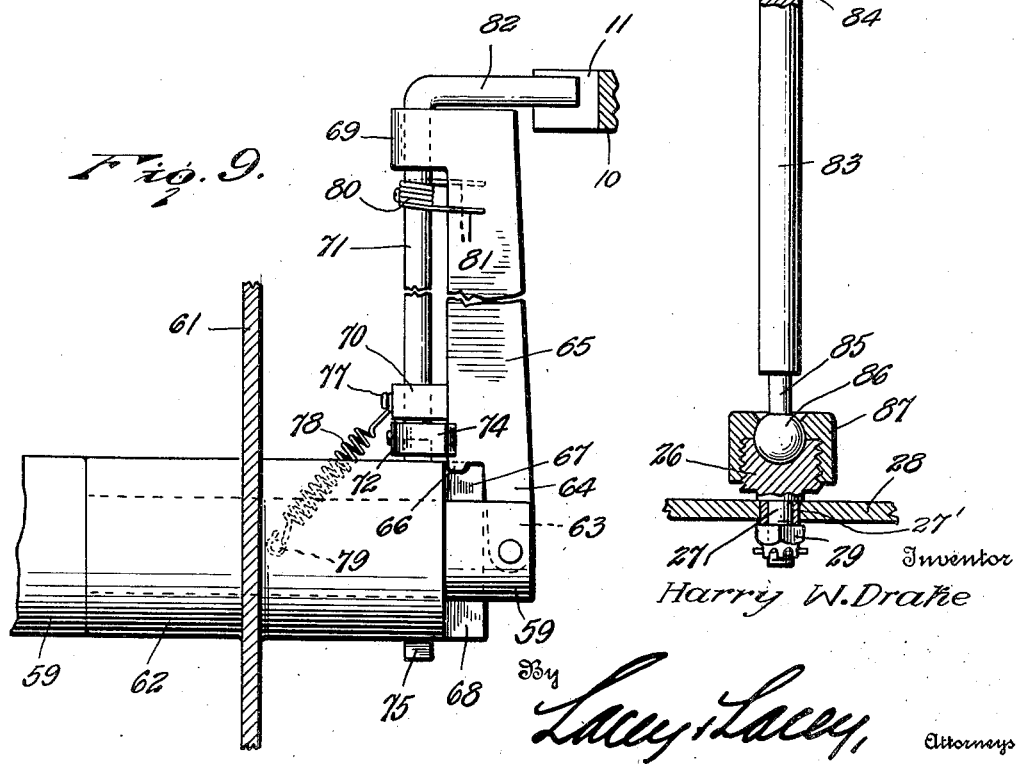

Patented Aug. 16, 1938

2,127,057

UNITED STATES PATENT OFFICE 2,127,057

STEERING DEVICE FOR TRAILERS

Harry W. Drake, Marshall, Ill.

Application May 22, 1937, Serial No. 144,229

9 Claims. (Cl. 280—33.55)

This invention relates to an improved steering device for a trailer, and one object of the invention is to provide an apparatus of this character so constructed that it may be applied to a trailer and have its rear end portion operatively connected with wheels of the trailer and its front end portion connected with the towing vehicle. It will thus be seen that the device serves as a towing bar for the trailer as well as serving as means for steering the trailer.

Another object of the invention is to so construct the device that, when the towing vehicle is steered to follow a curve in a road, a rod or shaft forming part of the trailer steering mechanism will be shifted longitudinally and the wheels of the trailer turned in a direction to cause the trailer to follow movement of the towing vehicle around the curve in the road.

Another object of the invention is to so construct the steering mechanism for the trailer that, when the towing vehicle is steered towards the right to follow a right hand turn in a road, the wheels of the trailer will be turned towards the left and thus the trailer caused to accurately follow the movement of the towing vehicle around a right hand turn in the road.

Another object of the invention is to so form the steering mechanism that, when the towing vehicle is backed, the wheels of the trailer may be caused to be turned in an opposite direction from that in which they are turned during forward movement of the towing vehicle and thus cause the trailer to be accurately steered when the trailer and the towing vehicle are moving rearwardly.

It is another object of the invention to provide means whereby the direction in which the wheels of the trailer are turned for steering may be adjusted by forward or rearward rotation of the trailer wheel and thus insure proper adjustment of this means according to whether the trailer is being moved forwardly or rearwardly.

Another object of the invention is to provide a device of this character which is very strong and durable and capable of standing hard usage.

The invention is illustrated in the accompanying drawings, wherein

Figure 1 is a top plan view showing the improved steering mechanism mounted upon the chassis of a trailer of the two wheel type and operatively connected with the rear bumper of a towing vehicle, Figure 2 is a sectional view upon an enlarged scale taken longitudinally through the draft bar of the steering mechanism, Figure 3 is a sectional view taken transversely through the draft bar along the line 3—3 of Figure 2, Figure 4 is a fragmentary view taken along the line 4—4 of Figure 2 and showing portions in sections and other portions in side elevation, Figure 5 is a fragmentary view taken along the line 5—5 of Figure 2, Figure 6 is a sectional view upon an enlarged scale taken vertically through the wheel of the trailer to which the steering mechanism is connected, Figure 7 is a sectional view taken along the line 7—7 of Figure 6, Figure 8 is a fragmentary view showing a portion of the mechanism in top plan and parts in section, Figure 9 is a view showing the elements of Figure 8 in side elevation, Figure 10 is a perspective view of the lower end portion of the adjusting rod or shaft shown in Figure 9, and Figure 11 is a top plan view illustrating a slightly modified construction wherein the steering mechanism is adapted for use with a trailer having front and rear wheels and steered from the rear wheels.

In Figure 1 the combined hitch and steering mechanism has been shown operatively associated with a trailer and a towing vehicle, and in this view the numeral 1 indicates in general the chassis of the trailer. This chassis may be of any length and width desired and is provided with the usual axle 2 with which a two wheel trailer is equipped. A spindle 3 is pivotally mounted at ends of the axle to carry a wheel 4 in the usual manner and the spindles have the usual arms 5 connected by a steering rod 6 so that the two wheels will turn together. Each wheel is also equipped with the usual brake drum 7 with which brake shoes of a conventional construction will be associated, but the brake shoes and their operating mechanism have been omitted as they form no part of this invention. The brake drums are secured to the spokes or the disks of the wheels by bolts 8 in the usual manner, and from an inspection of Figures 6 and 7, it will be seen that certain of the bolts 8 serve not only to secure the drum 7 to the wheel but also serve to secure a ring 9 within the brake drum of one wheel. This ring constitutes an element of the steering mechanism and is formed with an outstanding circumferentially extending flange 10 in which notches or recesses 11 are formed.

The draft bar 12 which constitutes a portion of the steering mechanism as well as serving as a draft bar is of hollow tubular formation and will be formed of pipe or metal tubing of a suitable length and diameter. This tubular draft bar extends through an opening formed in a cross bar 13 of the trailer chassis and carries a circumferentially extending flange 14 through which bolts 15 are passed to secure the draft bar to the cross bar 13. The forward portion of the draft bar is secured to the front cross bar 16 of the trailer chassis by a U-bolt or equivalent securing means 17, and upon referring to Figures 1 and 2, it will be seen that the forward end portion 18 of the draft bar is formed of a separate length of tubing having a flange 19 at its rear end which is secured against the flange 20 of the main section of the draft bar by bolts 21. A cap 22 is threaded upon the front end of the draft bar and from this cap extends a forwardly projecting neck or stem 23 carrying a ball 24 received in a socket 25. The retainer 26 of the socket is formed with a forwardly extending stem 27 adapted to be passed through the rear bumper 28 of the towing vehicle and secured by the nut 29. A bushing 27' fits about the stem so that, when the nut 29 is tightened, the stem and the bushing can turn relative to the bumper and thus twisting strains will be avoided. It will thus be seen that the front end of the draft bar will be connected with the bumper so that the trailer will be drawn along a road with the towing vehicle or moved rearwardly when the towing vehicle is backed. It will also be noted that since there is a ball and socket joint connecting the bumper of the towing vehicle with the front end of the draft bar the towing vehicle may have movement transversely of the draft bar when making turns, as indicated by the dotted lines in Figure 1. While it has been stated that the front end of the draft bar is to be connected with the rear bumper of the towing vehicle, it will be obvious that a special bracket for engagement with the draft bar may be provided upon the towing vehicle or the stem of the draft bar may be connected with any other portion of the towing vehicle found convenient.

Within the tubular draft bar is disposed a rod 30 which is slidably mounted through bushings 31 and intermediate its length carries a coupling 32 formed with a diagonally extending side arm 33 which projects outwardly through a slot 34 formed longitudinally of the draft bar in one side thereof. The arm 33 extends at a forward incline, as shown in Figures 1 and 2, and into this arm is screwed a bar 35 which is formed of strong metal and at its front end is pivoted to a link 36, as shown at 37. This link is movable laterally of the bar 35 in a horizontal plane about the pivot 37 and at its front end carries a socket 38 of the ball and socket type in which is mounted a ball 39 formed at the end of an arm 40 which extends from the socket 25 at one side thereof and has its free end portion curved rearwardly. By so connecting the rod 30 with the side arm 40 of the socket 25 the rod 30 will be slid longitudinally in the draft bar after the wall of the conical opening in the socket contacts the arm 40 when the towing vehicle is turned towards the right or left.

A casing 41 which has the outline of an elbow when viewed in top plan is screwed upon the rear end portion of the draft bar, and referring to Figures 3 and 4, it will be seen that this casing is formed of companion upper and lower sections 42 which are held in engagement with each other by bolts 43 passed through the ears 44. By so forming the casing or elbow it may be easily taken apart for assembling elements therein or for making repairs when necessary. A shaft 45 extends vertically in the casing 41 with its upper end mounted in a bearing 46 and its lower end portion journaled through a bearing 47. A lever arm 48 extends radially from the shaft 45 within the casing and this lever arm is connected with the shaft 30 by a link 49 extending longitudinally of the shaft and pivoted at its end to the shaft and to the lever arm. A second lever arm 50 is connected with the lower end of the shaft 45 by a pin or bolt 51 which constitutes a pivot mounting for the same, and upon referring to Figures 3 and 4, it will be seen that the lower lever arm 50 may be swung vertically about the pivot 51 from the position shown in full lines in Figures 1 and 4, in which it extends rearwardly of the trailer to the position indicated by dotted lines in these figures in which it projects towards the forward end of the trailer. A coupling 52 is mounted upon the reduced free end portion of the lower lever arm 50 where it is secured by a nut 53 and to this coupling one end of a link or rod 54 is connected by a bolt 55. This rod or elongated link 54 extends transversely of the trailer with its outer end portion projecting beyond one side of the chassis, as shown in Figure 1, and at its outer end is connected with a fork 56 which, in its turn, is pivotally connected with a short link 57 by a bolt 58 constituting a pivotal connection between the fork or socket 56 and the link 57. The link 57 has its other end connected with the outer end of a short shaft 59 by a pivot fastener 60, and it will be readily understood that, when the shaft 30 is shifted longitudinally and consequent longitudinal shifting movement imparted to the shaft 54 and since the shaft 59 is connected with a disk 61 carried by the spindle 3 constituting a shield or wall for the brake drum, the wheel to which the steering mechanism is connected will be turned for guiding purposes, as indicated by the dotted lines in Figure 1, and the other wheel simultaneously moved in the same direction by action of the rod 6 which connects the arms 5 of the two spindles.

The shaft 59 is rotatably mounted through a sleeve or bearing 62 which is rigidly carried by the disk or shield 61 and extending through the same. In view of the fact that the pivot fasteners 60 extend at right angle to the pivot fastener or bolt 58, the link 57 and the pivot will constitute a universal joint between the rod 54 and the shaft 59. Therefore, the rod or shaft 54 may be moved to the proper incline or angle when assembling the device upon a trailer and also the necessary pivotal movement may take place during swinging of the lever arm 50 from the position shown in full lines in Figure 1 to that indicated by dotted lines. The inner end portion of the shaft 59 is slotted, as shown at 63, and in this slot is pivotally mounted an ear 64 formed at the lower end of a lever arm 65 which extends upwardly from the shaft 59. A portion of the lower end of the lever arm 65 extends in overlapping relation to the inner end of the sleeve 62 and is formed with a depending lug 66 for abutting engagement with shoulders 67 and 68 formed by cutting away the inner end of the sleeve 62 for half the circumference thereof. It will thus be seen that the arm 65 serves as a latch for controlling rotation of the shaft 59 in the sleeve as well as serving as a lever or arm for imparting rotation to this shaft when necessary.

Upper and lower bearings 69 and 70 are carried by the lever arm 65 and through these bearings is journaled a rod or shaft 71 carrying at its lower end a head 72 formed with diverging arms 73 and 74 which straddle the lower portion of the lever arm 65 and are adapted to have engagement with ends of a flange or shoulder 75 extending about the sleeve 62 for approximately half the circumference thereof but not quite a full half. As shown in Figure 7, a pin 76 may be employed to firmly secure the head or cam 72 upon the lower end of the rod or stem 71 or the head may be firmly secured in any other desired manner. A pin 77 extends from the lower bearing 70 for engagement by one end of a spring 78 having its other end anchored to a pin 79 projecting from a side portion of the sleeve 62. This spring is movable about the anchoring pin 79 and serves to yieldably hold the lever arm 65 in position for its lug or tooth 66 to engage the shoulders 67 and 68 when the lever arm is in a position to extend upwardly from the shaft 59 and the sleeve 62 or downwardly therefrom. The shaft or stem 71 is yieldably held against turning movement in the bearings 69 and 70 by a spring 80 having arms 81 engaging opposite side faces of the lever arm 65 and, therefore, this rod or stem 71 will be yieldably held against turning movement with the arm or handle 82 at its upper end extending along the upper end of the lever arm parallel to the shaft 59. This turning arm or handle 82 projects beyond the lever arm into position to engage in the notches 11, and from an inspection of Figure 8, it will be readily seen that, when the wheel to which the bearing mechanism is connected is rotating in one direction, the end of the arm or handle 82 may slide out of and into the notches 11 and impart a partial rotation to the stem 71 without effecting adjustment of the steering mechanism whereas, when the wheel is rotated in an opposite direction, the arm of the cam head 72 having engagement with the adjacent end of the flange 75 will act upon this flange to swing the lever arm 65 to a position in which the tooth or lug 66 will be moved out of engagement with the shoulder 67 or 68 engaged thereby and the arm 65 then carried about the sleeve 62 and impart a half rotation to the shaft 59 and adjust the steering mechanism for either rearward or forward driving.

When this steering mechanism is in use, it is applied to the trailer, as shown in Figure 1, and the stem 27 at the forward of the draft bar secured through the rear bumper of the towing vehicle or to any convenient portion of the towing vehicle desired. The towing vehicle may then be driven forwardly along the road and as long as no turns are made the mechanism will remain in the position shown in full lines in Figure 1. When a turn is to be made toward the right, the rear end portion of the towing vehicle will be turned to dispose the rear bumper diagonally, as indicated by dotted lines in Figure 1, and the socket 25 will turn about the ball 24 and swing the arm 40 forwardly to exert pull upon the branch or arm 35 of the shaft 30. The shaft 30 will thus be slid forwardly through the draft bar 12 and exert pull upon the arm 48 to turn the shaft 45 and swing the arm 50 toward the left, as indicated by dotted lines in Figure 1. This swinging movement of the arm 50 exerts pull upon the link or rod 54 and the wheel with which this link is connected will be turned to extend diagonally as indicated by dotted lines in Figure 1, and the rod 6 will cause the other wheel to also turn to the dotted line position. The trailer will thus follow the towing vehicle around a right hand curve in a road and, when the towing vehicle is straightened out after making the turn, the elements of the steering mechanism will be returned to the full line position shown in Figure 1 and the wheels of the trailer returned to a position for traveling straight ahead. When it is desired to make a left hand turn, the same action takes place, except that a pushing force is exerted upon the branch arm 35 and the shaft 30 will be slid rearwardly in the draft bar. The wheels of the trailer will then be turned in an opposite direction from the inclined position in which they will move for a right hand turn and the trailer will accurately follow the towing vehicle around a left hand turn in a road. During forward movement of the trailer, the rear edge face of the arm 65 will be engaged by the portions of the ring 10 at the rear ends of the recesses 11 and the arm will move out of and into the recesses without effecting movement of the lever arm 65 as the arm 73 of the cam 72 will be free to move away from and then back into engagement with the upper end of the flange 75. When it is desired to back the towing vehicle and the trailer, the wheels of the trailer will then turn in an opposite direction to that in which they rotate during forward movement, and when the portion of the ring at the front end of the recess into which the arm or handle 82 extends engages the arm to impart turning movement to the stem 71, the arm 73 will be forced into engagement with the upper end of the flange 75 and a cam action will take place to tilt the lever arm 65 towards the ring and thus move the lug or tooth 66 upwardly out of engagement with the shoulder 67. The lever arm will then be carried rearwardly with the ring 10 and a half rotation imparted to the shaft 59. As soon as the lever arm moves beyond the shoulder 68, the spring 78 will pull the lever arm towards the sleeve 62 and the lug 66 will be moved to a position in front of the shoulder 68, at which time the arm 74 will be moved into position in front of the lower end of the flange 75 and the arm 82 will then be free to move out of and into the recesses 11 during turning of the wheels 4 in a direction to move the trailer rearwardly. The one-half rotation imparted to the shaft 59 will cause the rod 54 to be moved downwardly and forwardly in a circular path and the arm 50 will be swung from the full line position of Figure 4 in which it extends rearwardly from the shaft 45 to the dotted line position of this figure in which it projects forwardly from the shaft 45. Rearward movement of the shaft 30 caused by steering movement of the towing vehicle will now exert pull upon the rod 54 instead of a pushing action and the wheels of the trailer will be turned in the proper direction for steering the trailer during turning of the towing vehicle while being backed. Forward movement of the shaft 30 will exert push upon the rod 54 when in the dotted line position shown in Figures 1 and 4. It will thus be seen that the rod 54 and the arm 50 will be automatically swung from the position shown in full lines in Figure 1 to that indicated by dotted lines when the towing vehicle and the trailer are backed and that, when forward movement is resumed, the arm 74 will act upon the flange 75 to cause a partial rotation to be imparted to the shaft 59 and the lever 65 returned to the position shown in full lines and the rod 54 returned to the correct position for driving forwardly.

In Figure 11, there has been shown a modified construction adapting the steering mechanism for connection with a trailer having four wheels and steered by turning of its rear wheels. In this embodiment of the invention, the block 26 is removed from the socket 25 and a link 83 installed between the block 26 and the socket 25. This link or bar has a threaded head or block 84 at its rear end which is screwed into the socket 25 in place of the block 26 and at its forward end the bar is formed with a neck 85 terminating in a spherical head 86 held in engagement with the block 26 by a cap or socket 87. Therefore, universal joints will be provided at opposite ends of the link or bar 83 and when the towing vehicle is steered and the rear bumper moved to the position indicated by dotted lines in Figure 1 the arm 40 will be swung rearwardly instead of forwardly and the shaft 30 will be slid rearwardly instead of being drawn forwardly. This reversal of the directional movement of the shaft 30 is necessary in order that the rear wheels of a four-wheel trailer may be turned in the proper direction for following the towing vehicle around a right hand turn or left hand turn in a road. In other respects the operation of this embodiment of the invention is the same as previously described.

Having thus described the invention, what is claimed as new is:

1. In combination with a trailer including a chassis having an axle provided with interconnected pivotally mounted spindles and wheels rotatable about the spindles and provided with brake drums, a towing bar extending longitudinally of the chassis and carried thereby, a coupling connected with the front end of said towing bar for universal movement and adapted to be connected with a towing vehicle, a rod extending longitudinally of the draft bar and slidable longitudinally thereto, means for connecting said rod with said coupling and imparting longitudinal movement to the rod when the coupling is tilted laterally thereof by movements of the towing vehicle, a transverse rod having one end connected with the brake drum of one wheel, and a bell crank structure connecting the other end of the transverse rod with the first rod whereby turning movement will be imparted to the said wheel to steer the trailer when the first rod is slid longitudinally.

2. In combination with a trailer including a chassis provided with an axle having pivoted spindles and end guards carried by the spindles for brake drums of wheels mounted upon the spindles, a bar extending longitudinally of the trailer, a rod carried by said bar and slidable longitudinally thereof, a coupling connected with the front end of said bar for universal movement and adapted to be connected with a towing vehicle, arms extending from the coupling and rod and connected with each other for imparting longitudinal movement to the rod when the coupling is tilted transversely, a bell crank structure carried by the rear portion of said bar and having an upper arm pivotally connected with the rear end of said rod, and a transverse rod having one end connected with the lower arm of the bell crank structure and its other end connected with the guard whereby steering movement will be imparted to the spindles and wheels carried thereby when the rod is shifted longitudinally.

3. In combination with a trailer including a chassis having an axle provided with pivoted wheel spindles and wheels rotatable upon the spindles, the wheels being provided with brake drums and the spindles being provided with shields for the brake drums, a draft bar extending longitudinally of said chassis and having a coupling at its front end mounted for universal movement and adapted to be connected with a towing vehicle, a rod slidable longitudinally of said draft bar, a connection between the coupling and said rod for imparting longitudinal movement to the rod when the coupling is tilted transversely by movements of the towing vehicle, a bell crank structure carried by the rear portion of said draft bar and having upper and lower arms, the upper arm being pivotally connected with the rear end of said rod and the lower arm mounted for swinging adjustment from a position rearwardly of the upper arm to a position forwardly thereof, a transverse rod having one end connected with the lower arm of the bell crank structure, a terminal member for the other end of the transverse rod pivotally connected therewith and journaled through the shield for the brake drum of one wheel, and means actuated by change of directional rotation of the said wheel for imparting rotary movement to said terminal and swinging the lower arm of the bell crank structure from one side of the upper arm thereof to the other side and setting the steering mechanism for forward or rear steering.

4. In combination with a trailer having interconnected spindles and wheels rotatable upon the spindles, the wheels being provided with brake drums and the spindles carrying shields for the drums, a rod slidable longitudinally of the trailer, means for imparting sliding movement to the rod when a towing vehicle is steered to one side or the other, a transverse rod having its outer end connected with the shield for the brake drum of one wheel, and a bell crank structure including a shaft journaled vertically and having an upper arm connected with the rear end of said rod and a lower arm connected with the inner end of the transverse rod and movable from one side of the shaft to the other, whereby pivotal movement of the spindles in a predetermined direction for steering may be effected by longitudinal movement of the transverse arm when the rod is shifted longitudinally.

5. In combination with a trailer having pivotally mounted and interconnected spindles, wheels being carried by the spindles and provided with brake drums and the spindles carrying shields for the brake drums, a rod slidable longitudinally of said trailer, means for imparting longitudinal movement to said rod when a towing vehicle is steered to the right or left, a transverse rod, a bell crank structure connecting one end of the transverse rod with the rear end of the first rod and including an arm mounted for swinging movement from one side of the axis of the bell crank lever to the other side thereof and controlling directional movements of the transverse rod when the first rod is shifted longitudinally, a coupling connecting the outer end of the transverse rod with the shield carried by one spindle and rotatably mounted, and means actuated by a change in directional rotation of the wheel upon said spindle for imparting rotary motion to the coupling and shifting the position of the pivoted arm of the bell crank structure.

6. In combination with a trailer having interconnected pivotally mounted spindles and wheels rotatable thereon, the wheels being provided with brake drums and the spindles carrying shields for the brake drums, a rod slidable longitudinally of said trailer, means for imparting sliding movement to the rod when a towing vehicle is steered out of a straight path, a bell crank structure having an arm pivotally connected with the rear end of said rod and a second arm mounted for swinging adjustment from one side of the axis of the bell crank structure to the other side thereof, a transverse rod having its inner end pivotally connected with the last-mentioned arm of the bell crank structure, a terminal journaled through the shield for one wheel, a universal coupling between said terminal and the outer end of the transverse rod, a lever arm carried by said terminal and normally held against movement to turn the terminal, means for moving said lever arm into position to permit movement thereof to impart rotary motion to the terminal, and means carried by said wheels to actuate the last-mentioned means and effect turning of the terminal and reversal of the position of the swinging arm of the bell crank structure when directional rotation of the wheel is reversed.

7. In combination with a trailer including a pivotally mounted spindle and a wheel rotatable thereon, the wheel being provided with a brake drum and the spindle carrying a shield for the drum, a rod slidable longitudinally of the trailer and adapted to be shifted longitudinally when a towing vehicle is steered out of a straight path, a bell crank structure carrying an arm pivotally connected with the rear end of said rod and a second arm pivotally mounted for swinging adjustment from a position extending towards the rear end of the trailer to a position extending towards the front end of the trailer, a shaft journaled through said shield in radial spaced relation to one side of the spindle, a transverse rod extending diagonally between the shaft and swinging arm of the bell crank structure and pivotally connected with the shaft and swinging arm, a turning arm for said shaft extending radially therefrom and movable into and out of position to prevent turning of the shaft, a rod carried by the lever arm and rotatably mounted, means carried by the rod for effecting shifting of the lever arm to a position permitting turning of the shaft, a handle for said rod, and means carried by said wheel for acting upon said handle and moving the lever arm into position to permit turning of the shaft when directional rotation of the wheel is reversed.

8. In combination with a trailer having a pivotally mounted spindle and a wheel rotatable upon the spindle, the wheel being provided with a brake drum and the spindle carrying a shield for the drum, a rod slidable longitudinally of the trailer and adapted to be shifted longitudinally when a towing vehicle is steered out of a straight path, a bell crank structure having an arm pivotally connected with the rear end of said rod and a second arm extending longitudinally of the trailer and mounted for swinging movement from a position toward the rear end of the trailer to a position towards the front end thereof, a transverse rod extending diagonally of the trailer and having its inner end connected with the last-mentioned arm of the bell crank structure, a shaft extending outwardly from the outer end of said transverse rod, a sleeve extending through said shield at one side of the spindle, the shaft being journaled through said sleeve, a turning arm pivoted to the inner end of said shaft and extending radially thereof within the brake drum, said sleeve having shoulders spaced from each other circumferentially thereof and the turning arm having a tooth for engaging the shoulders, a flange extending partially about said sleeve, a stem extending longitudinally of said turning arm and rotatably mounted, a cam carried by the inner end of said stem for engaging said flange and moving the turning arm into position to swing the same out of engagement with a shoulder of the sleeve and permit turning of the shaft, the stem and the turning arm being yieldably held against movement out of a normal position, a crank arm for said shaft extending towards said wheel with its free end portion projecting beyond the turning arm, and a ring carried by said wheel and provided with members for engaging the crank arm to actuate the stem and move the turning arm out of engagement with a shoulder when directional rotation of the wheel is reversed.

9. In combination with a trailer including a spindle and a wheel rotatable thereon, the wheel being provided with a brake drum and the spindle having a shield for the brake drum, a tubular draft bar extending longitudinally of the trailer and formed with a side slot, a coupling connected with the front end of said draft bar and adapted to be connected with a towing vehicle, an arm extending from said rod through the slot in the draft bar, an arm extending laterally from said coupling, a link pivoted to said arm and extending forwardly therefrom with its front end connected with the arm of the coupling whereby longitudinal movement will be imparted to the rod when the coupling is tilted by steering movement of a towing vehicle, a housing connected with the rear end of said tubular draft bar and extending from one side thereof, a bell crank structure including a shaft journaled vertically in said housing with its lower end protruding from the housing, a link pivoted to the rear end of said rod, an upper arm for the bell crank structure extending radially from its shaft and pivoted to the rear end of said link, a lower arm for the bell crank structure pivoted to the lower end of the shaft thereof for swinging adjustment from a position extending towards the rear end of the trailer to a position extending towards the front end thereof, a transverse rod connected with the lower arm of the bell crank structure and extending diagonally towards the wheel, a shaft journaled through said shield at one side of the spindle and connected with the outer end of the transverse rod, means for normally preventing rotation of said shaft when the wheel is turning in a given direction, and means actuated by reversal of directional turning of the wheel for effecting turning of the shaft and swinging adjustment of the transverse rod and lower arm of the bell crank structure.

HARRY W. DRAKE.